Aug. 9, 1932.    F. X. LAUTERBUR ET AL    1,870,256

DOUGH MOLDING MACHINE

Filed Feb. 12, 1931      2 Sheets-Sheet 1

INVENTOR.
Frank X. Lauterbur
BY Edward J. Lauterbur

ATTORNEY.

Aug. 9, 1932.  F. X. LAUTERBUR ET AL  1,870,256
DOUGH MOLDING MACHINE
Filed Feb. 12, 1931  2 Sheets-Sheet 2

Patented Aug. 9, 1932

1,870,256

UNITED STATES PATENT OFFICE

FRANK X. LAUTERBUR AND EDWARD J. LAUTERBUR, OF SIDNEY, OHIO

DOUGH MOLDING MACHINE

Application filed February 12, 1931. Serial No. 515,271.

Our invention relates to dough molding or loaf forming machines, in which dough is rolled into cylindrical shapes or modifications of cylindrical shapes well known in the art which is exemplified in the prior patents granted Jan. 4, 1916—#1,167,187, Jan. 18, 1921—#1,366,266, Oct. 24, 1922—#1,432,874, May 5, 1925—#1,536,224 and May 5, 1925—#1,537,018, to which the present invention is applicable.

The object of the present invention is to afford a more complete adjustment of the parts associated with the conveyor in machines of this kind, with respect to diameter and length of the loaf as well as to the shape of the loaf in a longitudinal or axial plane, and to afford these advantages with simplified mechanism, easily accessible by the operator of the machine. For instance, in the prior Patent No. 1,537,018 above mentioned, the pressure board has edge sections and a middle section relatively angularly adjustable to change the longitudinal shape of the loaf, and the Patent No. 1,432,874 above mentioned has the pressure board made of two sections relatively laterally adjustable to change the length of the loaf, and in the present invention, these two adjustments are combined, together with mechanism parts of which function in both adjustments.

To the accomplishment of the said above and related ends, said invention then consists in the construction and novel combination of parts hereinafter fully described, illustrated in the accompanying drawings, and particularly pointed out in the claims hereto appended; it being understood that various changes in the form, proportion, size and minor details of construction, within the scope of the claims, may be resorted to without departing from the spirit or sacrificing any of the advantages of the invention.

Referring to the drawings.

Figure 1:
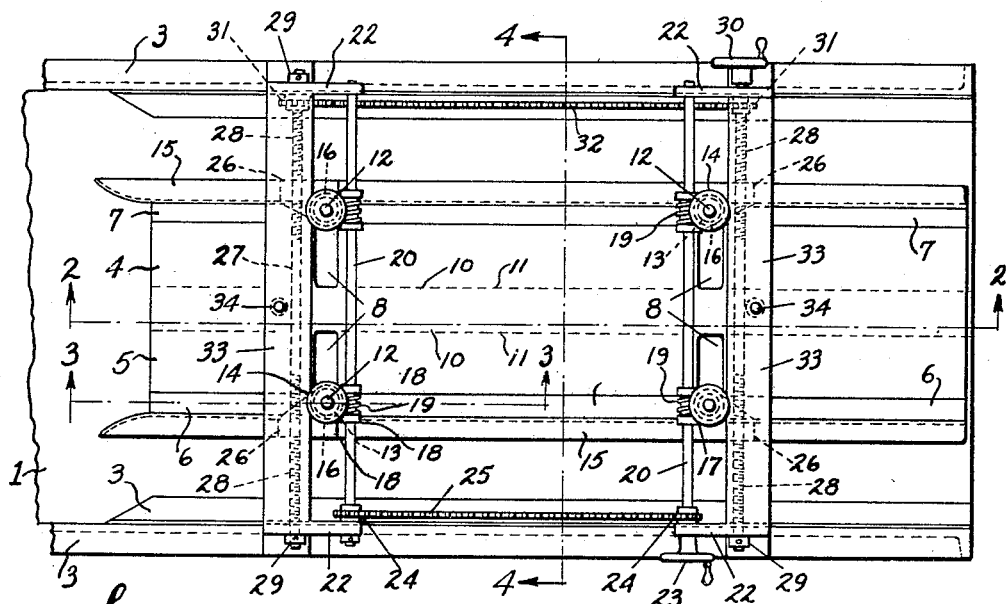
Figure 1 is a plan view of part of a dough molding machine embodying the invention with the parts at one extreme of their adjustment.
Figure 2:
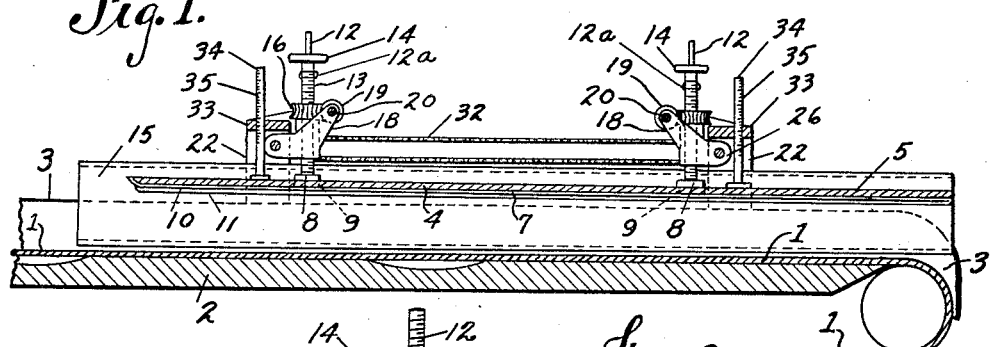
Figure 2 is a vertical longitudinal section on the plane of the line 2—2 of Figure 1.
Figure 3:
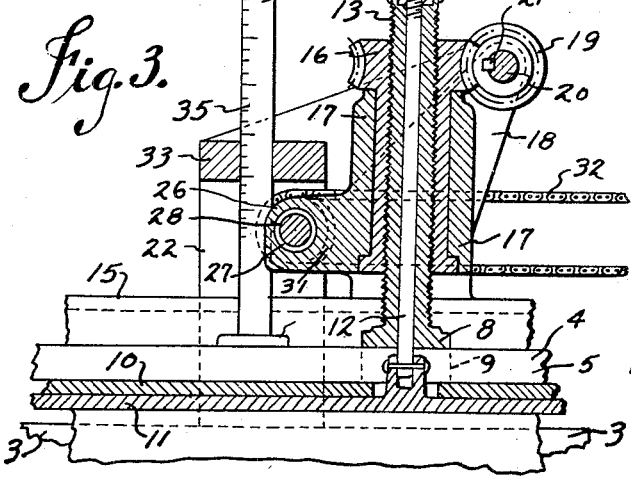
Figure 3 is a partial similar section on the plane of the line 3—3 of Figure 1.
Figure 4:
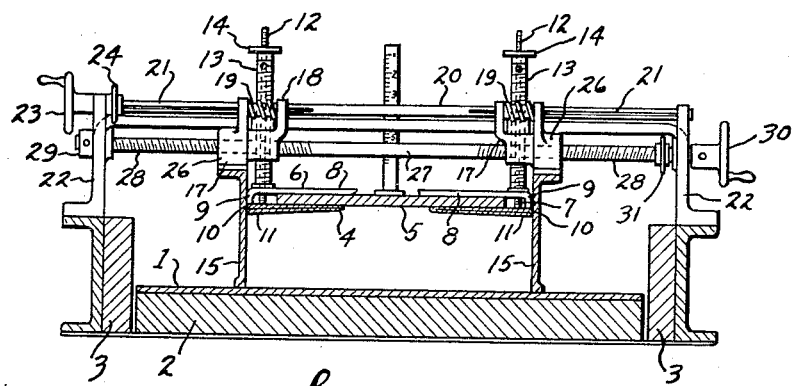
Figure 4 is a vertical cross section on the plane of the line 4—4 of Figure 1.
Figure 5:
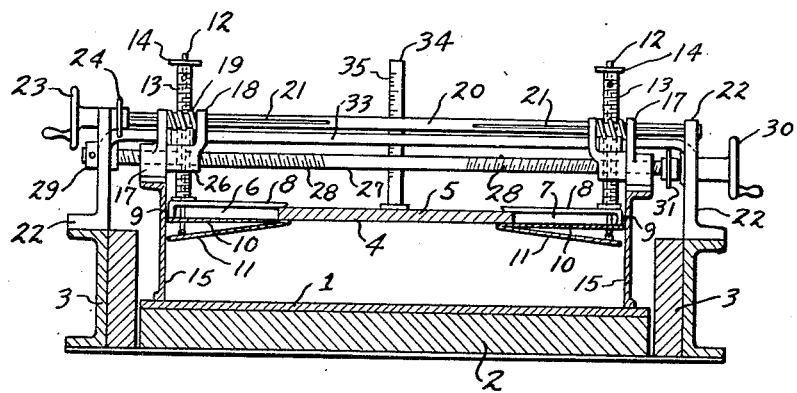
Figure 5 is the same section showing the parts at the other extreme of their adjustment.

In the accompanying drawings in which is illustrated the preferred embodiment of the invention, the flexible conveyor belt 1 travels along the top of the board 2 between side members 3 of the frame of the machine; it being understood that the board 2 usually will have an undulating top whereby a kneading effect is produced as the dough is carried along by the belt 1 with a rolling motion due to its contact with the pressure board 4 which faces the conveyor 1.

This pressure board here comprises a middle section 5 and edge sections 6 and 7, each made up of four plates 8 lapping across the top of the middle section 5, and with their laterally outer ends bent to form depending flanges 9; a thinner plate 10 with its inner thin edge lapping across the lower surface of the middle section 5 and its outer thicker edge fastened against the lower edges of the upper plate flanges 9; and a similar thin plate 11 below this plate 10 with its inner edge sharp and fastened against the inner edge portion of the upper thin plate 10, while near its laterally outer edge it is pivotally connected to upstanding threaded stems 12 at locations spaced lengthwise of the conveyor, where upstanding hollow screws 13 are fixed to the outer edge part of the upper thicker plates 8, with the respective threaded stems 12 extending up through these screws 13, at the tops of which screws the threaded stems have respective adjusting nuts 14, restrained axially by screws 12a.

The side walls 15 extend along the edge sections 7, with their lower edges close to the conveyor belt 1 and their inner surfaces close to the flanges 9 of the edge sections. On each one of the upstanding screws 13, a nut 16 is threaded, this nut being in the form of a worm gear, and being journalled in a respective bracket 17 fixed on the top edge of the adjacent side wall 15 and restrained from axial movement up and down in the bracket, so that if this nut is turned, it will coact with its screw 13 to raise or lower the part of the pressure board to which the screw 13 is fixed.

Each bracket 17 has arms 18 between which a worm 19 is in mesh with the worm gear 16. These brackets 17 and their associated parts are in pairs, those of a pair being aligned at right angles to the length of the conveyor, and in these arms 18 of each pair of brackets 17 is journalled a transverse shaft 20 having key ways 21 in which the worms 19 are splined, so that the worms 19 remain operatively engaged with the shaft 20 at any transverse adjustment of the walls 15 which carry these worms. Standards 22 are fixed on the respective side frame members 3, and the upper end parts of these standards form the journal bearings for the end parts of the shafts 20. One of these shafts 20 extends out past its standard at one side of the machine and has fixed on it a hand wheel 23 at the outer side of this standard, and at the inner sides of the standards at this side of the machine, sprocket wheels 24 are fixed on these shafts 20 and are connected by a sprocket chain 25, so that when the one shaft is turned by the hand wheel the other shaft will turn in unison therewith, and as each shaft 20 will rotate the worm gear nuts 16 in unison, the pressure board 4 will be uniformly raised or lowered throughout its extent by simply turning the one hand wheel 23.

Each bracket 17 has, lower down and at its opposite side, a boss 26, with a transverse threaded opening; and for each pair of oppositely located brackets there is a screw 27 having opposite threads 28 in the respective threaded openings of the bosses 26, and extending out and being journalled in the adjacent standards 22. At one end outside the standard 22, each screw has a collar 29, and at the opposite side, one of these screws extends out and has fixed on it at the outer side of the standard 22, a hand wheel 30, while at the inner sides of the standards, the two screws have fixed on them respective sprocket wheels 31 connected by a sprocket chain 32. Preferably the hand wheel 23 and sprocket gearing of the shaft 20 is on the side of the machine opposite from that having the hand wheel 30 and sprocket gearing of the screw 27, so that these parts are not in the way of each other; the two hand wheels 23 and 30, however preferably being located at the same end of the apparatus. By rotating the single hand wheel 30, both screws 27 are turned, and these coacting with the threaded brackets 17 move the walls 15 toward or away from each other while maintaining these walls parallel. Since the screws 13 are fixed on the respective edge sections of the pressure board 4, and are threaded through the brackets 17, traveling with the walls 15, the edge sections will be adjusted along with the walls across the conveyor 1, so that there is no need for any special attention to maintain the walls close to or in contact with the edges of the pressure board.

The standards 22 at each end of the apparatus are connected by a cross piece 33, which not only serves to brace the structure, but at its middle has an opening up through which is guided a shank 34, the lower end of which is fixed to the top of the middle section 5 of the pressure board 4; thus serving to maintain this middle section 5 midway of the width of the apparatus at all outward and inward adjustments of the edge sections 6 and 7 of the pressure board. Preferably this shank 34 has a vertical series of graduations 35 readable by reference to the upper edge of the opening through the cross piece 33.

The operator, standing at the side, turning the hand wheel 23 to raise or lower the pressure board for a loaf of greater or less diameter, thus can see by the graduations where he is setting the pressure board without looking or reaching inside the machine. If he wishes to change the shape of the ends of the loaf, he can increase or decrease the inclination of the edge section plates 11 by turning the nuts 14 outside the top of the apparatus. It will be seen therefore that the several adjustments are made in a most convenient manner, in a way to insure a maintenance of accuracy of the relation of the parts to each other, with a minimum of danger to the workmen and therefore safely to be made while the machine is running, if desired. By the compact combination of connections afforded by the brackets 17, and their immediately associated parts, there is considerable economy, both in the number of parts required and in the amount of work necessary to make the parts, thereby considerably reducing the cost of a machine of this character, in addition to increasing its usefulness and the convenience of its use as just explained.

Having thus described our invention, what we claim as new and desire to secure by Letters Patent, is:

1. In a machine of the character described, in combination with conveying means, a pressure board facing the conveying means comprising relatively laterally movable sections whereby the width of the pressure board may be changed, walls along the lateral edges of said pressure board, adjustable across said conveying means, and means accessible outside the space between said walls for causing the relative lateral movement of said sections.

2. In a machine of the character described, in combination with conveying means, a pressure board movable to be spaced various distances from the conveying means, comprising relatively laterally movable sections whereby the width of the pressure board may be changed, walls along the lateral edges of said pressure board, adjustable across said conveying means, and means movable with the respective sections permitting the relative lateral movement, and operable to cause the spacing movement of said pressure board.

3. In a machine of the character described, in combination with conveying means, a pressure board facing the conveying means comprising a middle section and edge sections along the edges of the middle section and laterally movable relative to said middle section whereby the width of the pressure board may be changed, and walls along the outer edges of said edge sections, adjustable across said conveying means.

4. In a machine of the character described, in combination with conveying means, a pressure board facing the conveying means comprising a middle section and edge sections along the edges of the middle section and laterally movable relative to said middle section whereby the width of the pressure board may be changed, and walls along the outer edges of said edge sections, adjustable across said conveying means, at least a part of each edge section being inclinable in opposite directions to a greater or less degree to diverge more or less toward said conveying means.

5. In a machine of the character described, in combination with conveying means, an enclosure for confining material to said conveying means comprising side walls and a top having its side walls movable toward and from each other across the conveying means and having its top changeable in width and in shape where presented toward said conveying means.

6. In a machine of the character described, in combination with conveying means, an enclosure for confining material to said conveying means comprising side walls and a top having its side walls movable toward and from each other across the conveying means and having its top changeable in shape where presented toward said conveying means, and changeable as to width in accordance with the degree of separation of said side walls.

7. In a machine of the character described, in combination with conveying means, an enclosure for confining material to said conveying means having walls movable at both sides whereby it is adjustable as to width, and mechanism for moving said walls simultaneously and inversely for changing said width, accessible outside said enclosure.

8. In a machine of the character described, in combination with conveying means, an enclosure for confining material to said conveying means, adjustable as to width and height, mechanism for adjusting said width, and mechanism for adjusting said height, each of said mechanisms being accessible outside of said enclosure at a side thereof.

9. In a machine of the character described, in combination with conveying means, an enclosure for confining material to said conveying means, adjustable as to width and also adjustable as to shape of its cross section, mechanism for adjusting the width, and mechanism for adjusting the shape of cross section, both of said mechanisms being accessible outside said enclosure.

10. In a machine of the character described, in combination with a conveying means and side walls adjustable transversely of the conveyor, a pressure board facing said conveyor comprising sections relatively adjustable both angularly in a transverse plane and transversely of the conveyor, whereby the width and cross sectional shape of said pressure board may be changed.

11. In a machine of the character described, in combination with a conveying means and side walls adjustable transversely of the conveyor, a pressure board facing said conveyor comprising a middle section and edge sections lapping said middle section and adjustable transversely of the conveyor, whereby the width of said pressure board may be changed.

12. In a machine of the character described, in combination with a conveying means and side walls adjustable transversely of the conveyor, a pressure board facing said conveyor comprising a middle section and edge sections lapping said middle section and adjustable angularly in a transverse plane and transversely of the conveyor, whereby the width and cross sectional shape of said pressure board may be changed.

13. In a machine of the character described, in combination with a conveying means and side walls adjustable transversely of the conveyor, a pressure board facing said conveyor comprising a middle section and edge sections lapping said middle section and adjustable transversely of the conveyor, whereby the width of said pressure board may be changed, and spacing means connected to an edge section for adjusting the pressure board various distances from the conveying means.

14. In a machine of the character described, in combination with a conveying means and side walls adjustable transversely of the conveyor, a pressure board facing said conveyor comprising sections relatively adjustable both angularly in a transverse plane and transversely of the conveyor, whereby the width and cross sectional shape of said pressure board may be changed, adjusting devices connected to the respective sections, each device comprising means for making the lateral adjustment and means for making the angular adjustment, and an operative connection between said devices to operate their lateral adjustment means in unison.

15. In a machine of the character described, in combination with conveying means, a pressure board facing the conveying means comprising relatively laterally movable sections whereby the width of the pressure board may be changed, walls along the lateral edges of said pressure board, adjustable across said conveying means, brackets on the respective walls, screws threaded in the respective brackets and connected to respective pressure board sections, nuts for said screws, axially restrained in said brackets, gear means engaging the respective nuts, and a shaft slidably journalled in the brackets transversely of the conveying means and splined to said gear means.

16. In a machine of the character described, in combination with conveying means, a pressure board facing the conveying means comprising relatively laterally movable sections whereby the width of the pressure board may be changed, walls along the lateral edges of said pressure board, adjustable across said conveying means, brackets on the respective walls, screws threaded in the respective brackets and connected to respective pressure board sections, nuts for said screws, axially restrained in said brackets, gear means engaging the respective nuts, and a shaft slidably journalled in the brackets transversely of the conveying means and splined to said gear means, and a screw transverse to the conveyor and having oppositely directed threads engaging in the respective brackets.

17. In a machine of the character described, in combination with conveying means, a pressure board facing the conveying means comprising relatively laterally movable sections whereby the width of the pressure board may be changed, walls along the lateral edges of said pressure board, adjustable across said conveying means, pairs of brackets on the respective walls, at locations spaced along said conveying means, screws threaded in the respective brackets and connected to the pressure board section at the respective side of the machine, nuts for said screws, axially restrained in said brackets, gear means engaging the respective nuts, shafts, one slidably journalled in each pair of brackets transversely of the conveying means and splined to the gear means of the pair of brackets, and means extending along the conveyor and operatively connecting said shafts.

18. In a machine of the character described, in combination with conveying means, a support for said conveying means, a pressure board adjustable toward and away from said conveying means and facing said conveying means, comprising a middle section and edge sections adjustable transversely relatively to said middle section, a member on said support extending across said middle section, and a shank extending from said middle section and guidingly engaged by said member.

19. In a machine of the character described, in combination with conveying means, a support for said conveying means, a pressure board adjustable toward and away from said conveying means and facing said conveying means, comprising a middle section and edge sections adjustable transversely relatively to said middle section, a member on said support extending across said middle section, and a shank extending from said middle section and guidingly engaged by said member, and graduations on said shank readable with reference to a part of said guiding member whereby the spacing between the conveying means and the pressure board is indicated outside the machine.

FRANK X. LAUTERBUR.
EDWARD J. LAUTERBUR.